US012651995B2

(12) United States Patent
Chang et al.

(10) Patent No.: US 12,651,995 B2
(45) Date of Patent: Jun. 9, 2026

(54) PHOTOVOLTAIC SYSTEM

(71) Applicant: AUO Corporation, Hsinchu City (TW)

(72) Inventors: Li-Wei Chang, Hsinchu City (TW);
Chia-Hsien Hsueh, Hsinchu City
(TW); Hung-Yang Lin, Hsinchu City
(TW); Tien-Yu Lin, Hsinchu City
(TW); Jared Bradford, Hsinchu City
(TW)

(73) Assignee: AUO CORPORATION, Hsinchu City
(TW)

( * ) Notice: Subject to any disclaimer, the term of this
patent is extended or adjusted under 35
U.S.C. 154(b) by 0 days.

(21) Appl. No.: 18/897,925

(22) Filed: Sep. 26, 2024

(65) Prior Publication Data

US 2026/0088750 A1      Mar. 26, 2026

(51) Int. Cl.
  *H02S 20/23*          (2014.01)
  *H02S 40/34*          (2014.01)
  *H02S 40/36*          (2014.01)
(52) U.S. Cl.
  CPC .............. *H02S 20/23* (2014.12); *H02S 40/34*
             (2014.12); *H02S 40/36* (2014.12)
(58) Field of Classification Search
  CPC ........... H02S 40/30; H02S 40/32; H02S 40/34
  See application file for complete search history.

(56) References Cited

U.S. PATENT DOCUMENTS

| 2009/0205703 A1 | 8/2009 | Umotoy |
| 2012/0134129 A1* | 5/2012 | Josefiak ............... H05K 5/0204 |
| | | 220/1.5 |
| 2024/0048087 A1 | 2/2024 | Chang |

FOREIGN PATENT DOCUMENTS

| DE | 102010039610 A1 * | 2/2012 | ............. F24S 25/15 |
| FR | 2923082 A1 | 5/2009 | |
| TW | 201904190 A | 1/2019 | |
| TW | M624567 U | 3/2022 | |
| TW | M646138 U | 9/2023 | |

OTHER PUBLICATIONS

English language machine translation of DE-102010039610-A1.
(Year: 2025).*

* cited by examiner

*Primary Examiner* — Eli S Mekhlin
(74) *Attorney, Agent, or Firm* — WPAT, PC

(57)              ABSTRACT
A photovoltaic system includes a sheet, a bracket, and a
photovoltaic panel. The sheet has a base board and two side
walls. The two side walls are opposite to each other and
connected to the base board. The base board and the two side
walls form an accommodating space. The bracket is in the
accommodating space. The bracket includes a main portion,
a first side portion, and a second side portion. The first side
portion extends from a first side of the main portion along
one of the two side walls and is coupled to the one of the two
side walls. The second side portion extends from a second
side of the main portion. The first side is adjacent to the
second side. The photovoltaic panel is in the accommodating
space and over the main portion of the bracket.

22 Claims, 10 Drawing Sheets

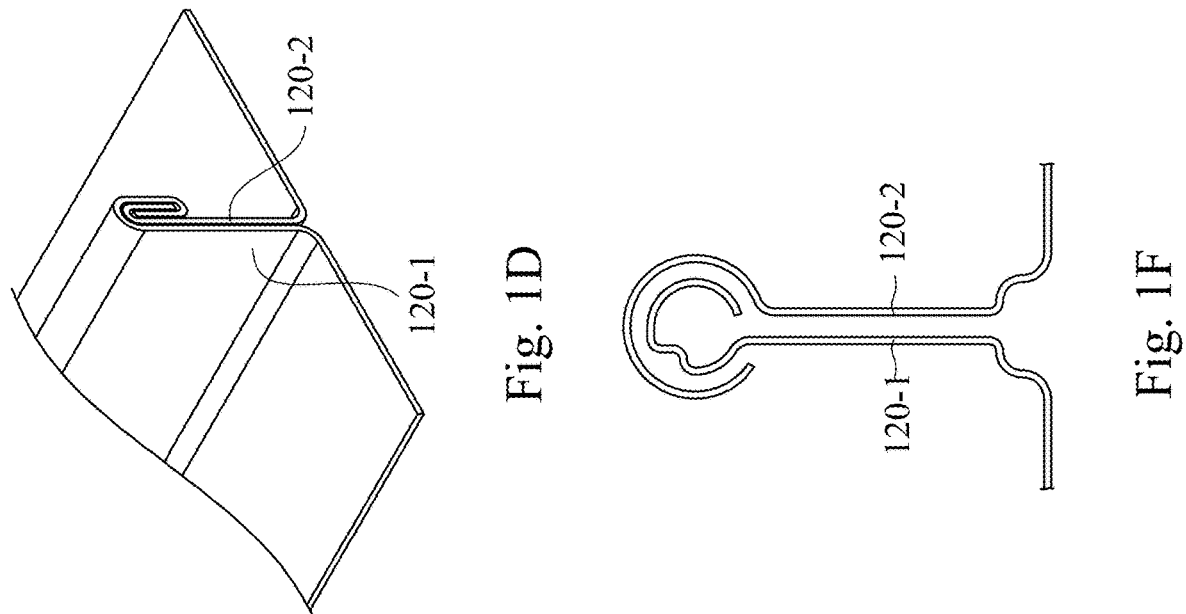
Fig. 1C
Fig. 1D
Fig. 1F
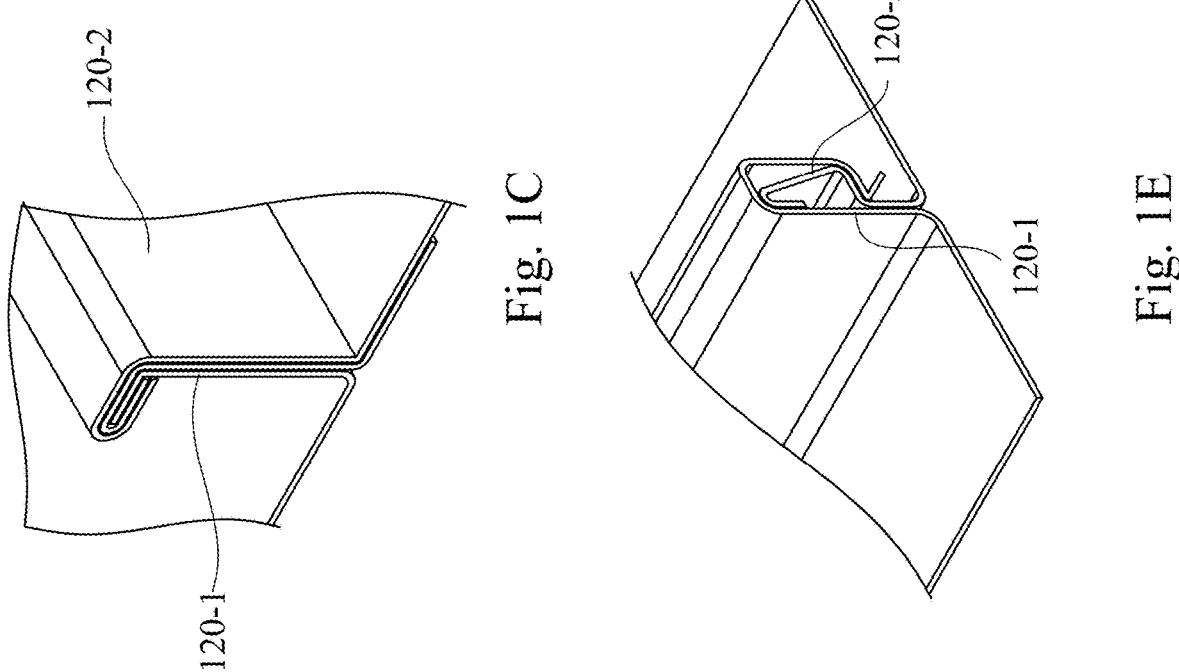
Fig. 1E

10'

300

400

100

200C

210

211

400

213

PHOTOVOLTAIC SYSTEM

BACKGROUND

Technical Field

The present disclosure relates to a photovoltaic system. More particularly, the present disclosure relates to a photovoltaic system with building-integrated photovoltaic (BIPV) modules.

Description of Related Art

With the rapid advancement of manufacturing technology, the costs associated with the production of solar photovoltaic panels and the electricity generation cost of the solar photovoltaic panels have gradually decreased. As a result, building-integrated photovoltaic (BIPV) modules combining solar photovoltaic panels with building envelopes have progressively become a compelling option for incorporating power generation systems into buildings.

However, the majority of commonly used building-integrated photovoltaic modules involve installing solar photovoltaic panels on rooftops using brackets and frames. These brackets and frames often demand significant manpower, time, and cost for installation and upkeep. For example, conventional mounting structures utilize rails to integrate photovoltaic panels into roof structures to form photovoltaic arrays. This process necessitates skilled labor to set up the rails and install the photovoltaic panels onto the roof structures via the rails, often requiring work at elevated heights, thereby leading to substantial labor and maintenance expenses.

Accordingly, how to provide a photovoltaic system to solve the aforementioned problems becomes an important issue to be solved by those in the industry.

SUMMARY

An aspect of the disclosure is to provide a photovoltaic system that may efficiently solve the aforementioned problems.

According to an embodiment of the disclosure, a photovoltaic system includes a sheet, a bracket, and a photovoltaic panel. The sheet has a base board and two side walls. The two side walls are opposite to each other and connected to the base board. The base board and the two side walls form an accommodating space. The bracket is in the accommodating space. The bracket includes a main portion, a first side portion, and a second side portion. The first side portion extends from a first side of the main portion along one of the two side walls and is coupled to the one of the two side walls. The second side portion extends from a second side of the main portion. The first side is adjacent to the second side. The photovoltaic panel is in the accommodating space and over the main portion of the bracket.

In an embodiment of the disclosure, the bracket is made of a continuous unitary piece of material.

In an embodiment of the disclosure, a top surface of the photovoltaic panel is lower than top surfaces of the two side walls.

In an embodiment of the disclosure, the second side portion of the bracket extends a distance greater than about 1 mm from the second side of the main portion toward the base board of the sheet.

In an embodiment of the disclosure, the second side portion is separated from the sheet.

In an embodiment of the disclosure, the first side portion is separated from the second side portion.

In an embodiment of the disclosure, the first side portion is connected to the second side portion.

In an embodiment of the disclosure, the first side portion extends along the one of the two side walls to the base board and is attached to the base board.

In an embodiment of the disclosure, a ratio of an area of the main portion of the bracket to an area of the photovoltaic panel is between about 1% and about 40%.

In an embodiment of the disclosure, a ratio of an area of the first side portion of the bracket to an area of the photovoltaic panel is in a range from about 0.3% to about 10%.

In an embodiment of the disclosure, the bracket further comprises a third side portion, the third side portion is connected to a side of the first side portion that is opposite to the first side of the main portion, and the third side portion extends away from the one of the two side walls.

In an embodiment of the disclosure, the photovoltaic system further includes a cable electrically connected to the photovoltaic panel. The cable is in the accommodating space and mounted onto the bracket through the third side portion.

According to another embodiment of the disclosure, a photovoltaic system includes a sheet, a bracket, and a photovoltaic panel. The sheet has a base board and two side walls. The two side walls are opposite to each other and connected to the base board. The base board and the two side walls form an accommodating space. The bracket is in the accommodating space. The bracket includes two first side portions and a second side portion. The two first side portions are attached to a plurality of inner surfaces of the two side walls, respectively. The second side portion is between the two first side portions. The photovoltaic panel is in the accommodating space. The photovoltaic panel is mounted to the bracket. A top surface of the photovoltaic panel is lower than top surfaces of the two side walls.

In an embodiment of the disclosure, the two first side portions extend along the inner surfaces of the two side walls, respectively.

In an embodiment of the disclosure, the second side portion of the bracket extends toward the base board of the sheet and is separated from the sheet.

In an embodiment of the disclosure, each of the first side portions is separated from the second side portion.

In an embodiment of the disclosure, each of the first side portions is connected to the second side portion.

In an embodiment of the disclosure, at least one of the first side portions extends below the second side portion and is attached to the base board.

In an embodiment of the disclosure, a ratio of an area of one of the first side portions of the bracket to an area of the photovoltaic panel is in a range from about 0.3% to about 10%.

In an embodiment of the disclosure, the photovoltaic panel is mounted to the bracket through a mounting surface of the bracket, and a ratio of an area of the mounting surface to an area of the photovoltaic panel is in a range from about 1% to about 40%.

Accordingly, in the photovoltaic system of some embodiments of the present disclosure, the photovoltaic panels are embedded into the accommodating spaces of the roofing sheets through the brackets to form modules before installing the roofing sheets. In this way, the modules can be installed using the same method as conventional roofing sheets. Therefore, fewer assembly steps are conducted on the rooftop of the building after the modules are installed.

Compared with common photovoltaic systems, the photovoltaic system of some embodiments of the present disclosure may reduce the time and cost associated with working at heights.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 1C, FIG. 1D, FIG. 1E, and FIG. 1F are partial enlarged views of a photovoltaic system in accordance with some embodiments of the present disclosure;

DETAILED DESCRIPTION

Figure 1A:
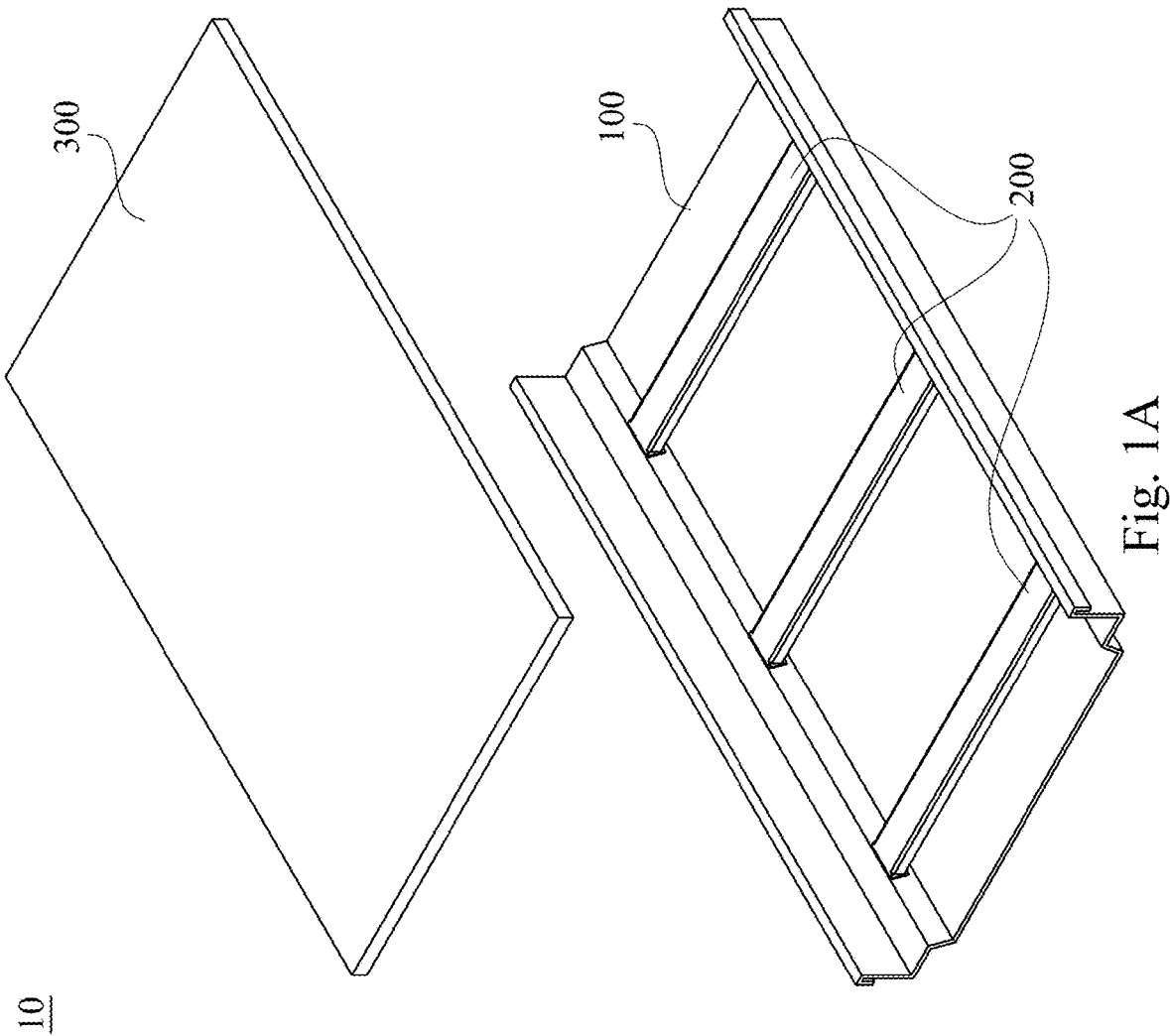
FIG. 1A is a schematic diagram of a photovoltaic system in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1B:
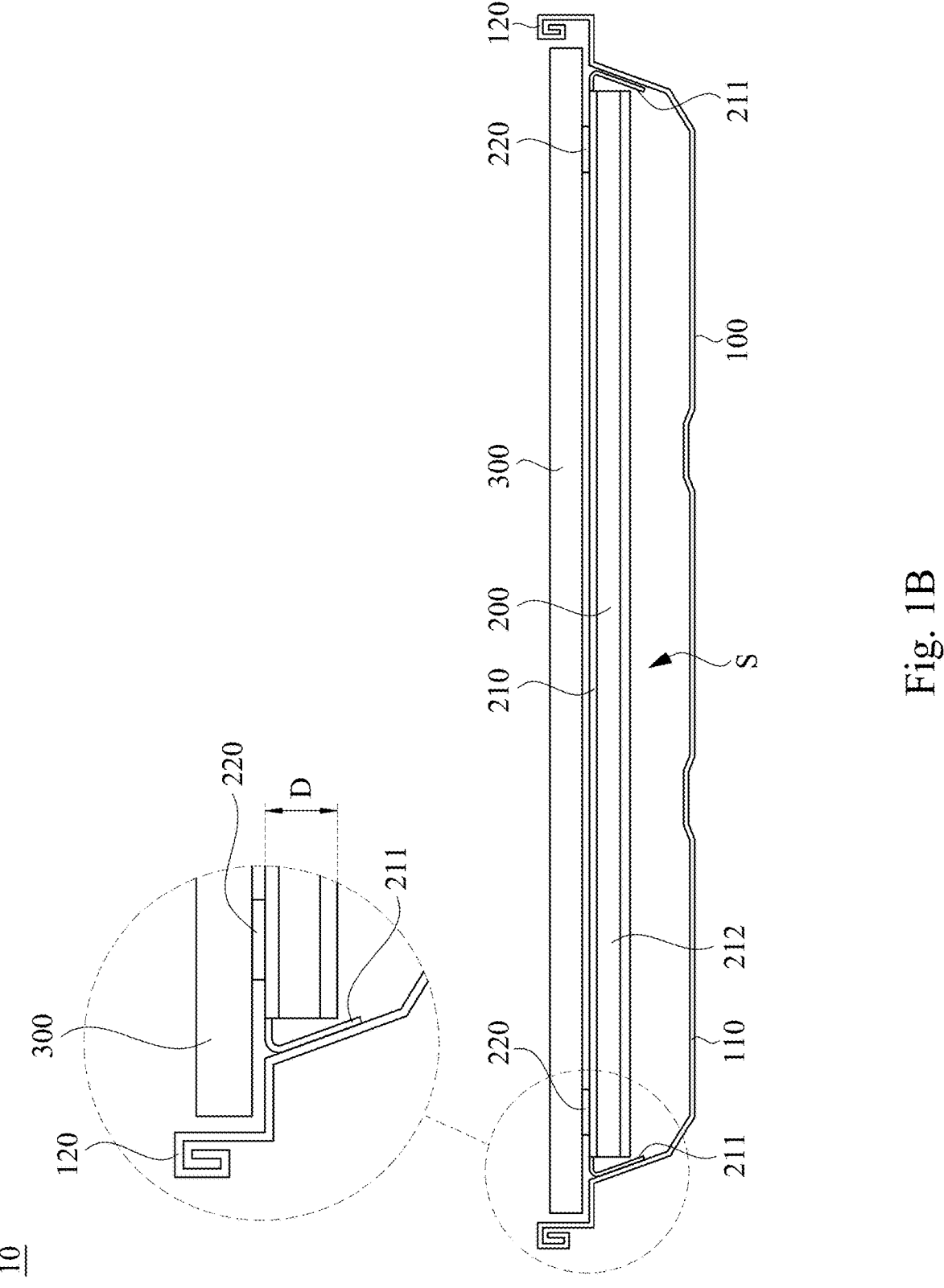
FIG. 1B is a side view of a photovoltaic system in accordance with some embodiments of the present disclosure.

Reference is made to FIG. 1A and FIG. 1B. FIG. 1A is a schematic diagram of a photovoltaic system 10 in accordance with some embodiments of the present disclosure. FIG. 1B is a side view of the photovoltaic system 10 in accordance with some embodiments of the present disclosure. FIG. 1C, FIG. 1D, FIG. 1E, and FIG. 1F are partial enlarged views of the photovoltaic system 10 in accordance with some embodiments of the present disclosure.

The photovoltaic system 10 includes a plurality of modules. Each module includes a sheet 100, a bracket 200, and a photovoltaic panel 300, as shown in FIG. 1A and FIG. 1B.

The sheet 100 has a base board 110 and two side walls 120, as shown in FIG. 1B. The base board 110 may be a corrugated sheet or a box profile sheet, providing structural integrity and versatility. The side walls 120 are connected to the base board 110. The side walls 120 are opposite to each other. The base board 110 and the side walls 120 together form an accommodating space S. In some embodiments, the sheet 100 serves as a roofing sheet. The side walls 120 have C structures at their top portions so that several sheets 100 may be hinged together through the C structures. Details about the C structures will be described in the following paragraph. In some embodiments, the sheet 100 may be made of a continuous unitary piece of material. For example, the sheet 100 may be a substantially U-shaped sheet pile formed through a metal rolling process. The U-shaped design is particularly beneficial for roofing applications, as it allows for water drainage and increased load-bearing capacity. In some embodiments, a thickness of the sheet 100 may vary between about 0.2 mm and about 4.6 mm.

Reference is made to FIG. 1C to FIG. 1F, which illustrate how C structures of side walls of sheets of two adjacent modules are hinged in accordance with various embodiments of the present disclosure. In some embodiments, as shown in FIG. 1C and FIG. 1D, a C structure of a side wall 120-1 of one module and a C structure of a side wall 120-2 of the other module have mutually complementary profiles and are jointed closely together. In some other embodiments, as shown in FIG. 1E and FIG. 1F, a C structure of a side wall 120-1 of one module and a C structure of a side wall 120-2 of the other module have interlocking curved sections with spaces therebetween.

Referring back to FIG. 1B, the bracket 200 is in the accommodating space S. The bracket 200 includes a main portion 210 and two side portions 211. The main portion 210 spans over the base board 110 of the sheet 100. The side portions 211 extend from two opposite sides of the main portion 210 and along the side walls 120 of the sheet 100. The bracket 200 is coupled to the two side walls 120 through the two side portions 211. In some embodiments, the side portions 211 are fastened to a plurality of inner surfaces of the side walls 120 using mechanical fasteners such as rivets and screws (not shown). These fasteners provide a strong and reliable connection, ensuring the stability of the bracket 200. In some other embodiments, the side portions 211 are adhered to the inner surfaces of the side walls 120 through silicone, VHB tapes, a combination thereof, or the like. In still some other embodiments, a cold forming process may be performed to form riveted joints between the side portions 211 and the side walls 120, further enhancing the structural integrity of the bracket 200.

In addition, the bracket 200 further includes two side portions 212 (one of which is not visible in the figures due to the viewing angle) for enhancing the load carrying capacity of the bracket 200. The side portions 212 extend from two other opposite sides of the main portion 210 and extend downward toward the base board 110 of the sheet 100. In some embodiments, the side portions 212 extend a distance D from the main portion 210. The distance D may be greater than about 1 mm. For example, the distance D may be between about 3 mm and about 15 mm. Such extension ensures that the bracket 200 can effectively distribute loads and maintain its structural integrity under various conditions.

The photovoltaic panel 300 is in the accommodating space S and over the main portion 210 of the bracket 200, as shown in FIG. 1B. The photovoltaic panel 300 may include a plurality of individual solar cells (not shown) wired together, but the present disclosure is not limited thereto. In some embodiments, the photovoltaic panel 300 is mounted to a mounting surface of the main portion 210 of the bracket 200 using adhesives 220 such as silicon or VHB tapes, ensuring that the photovoltaic panel 300 remains securely in place. A top surface of the photovoltaic panel 300 is lower than top surfaces of the side walls 120. In other words, the photovoltaic panel 300 is not higher than the side walls 120, making the module of the photovoltaic system 10 an embedded structure. The embedded structure offers several advantages, including enhanced protection for the photovoltaic panel 300 from environmental impacts and a more streamlined appearance. In some embodiments, before the photovoltaic panel 300 is installed, two to ten brackets 200 are attached to the sheet 100 to distribute the load evenly and enhance the overall durability of the photovoltaic system 10.

Figure 2:
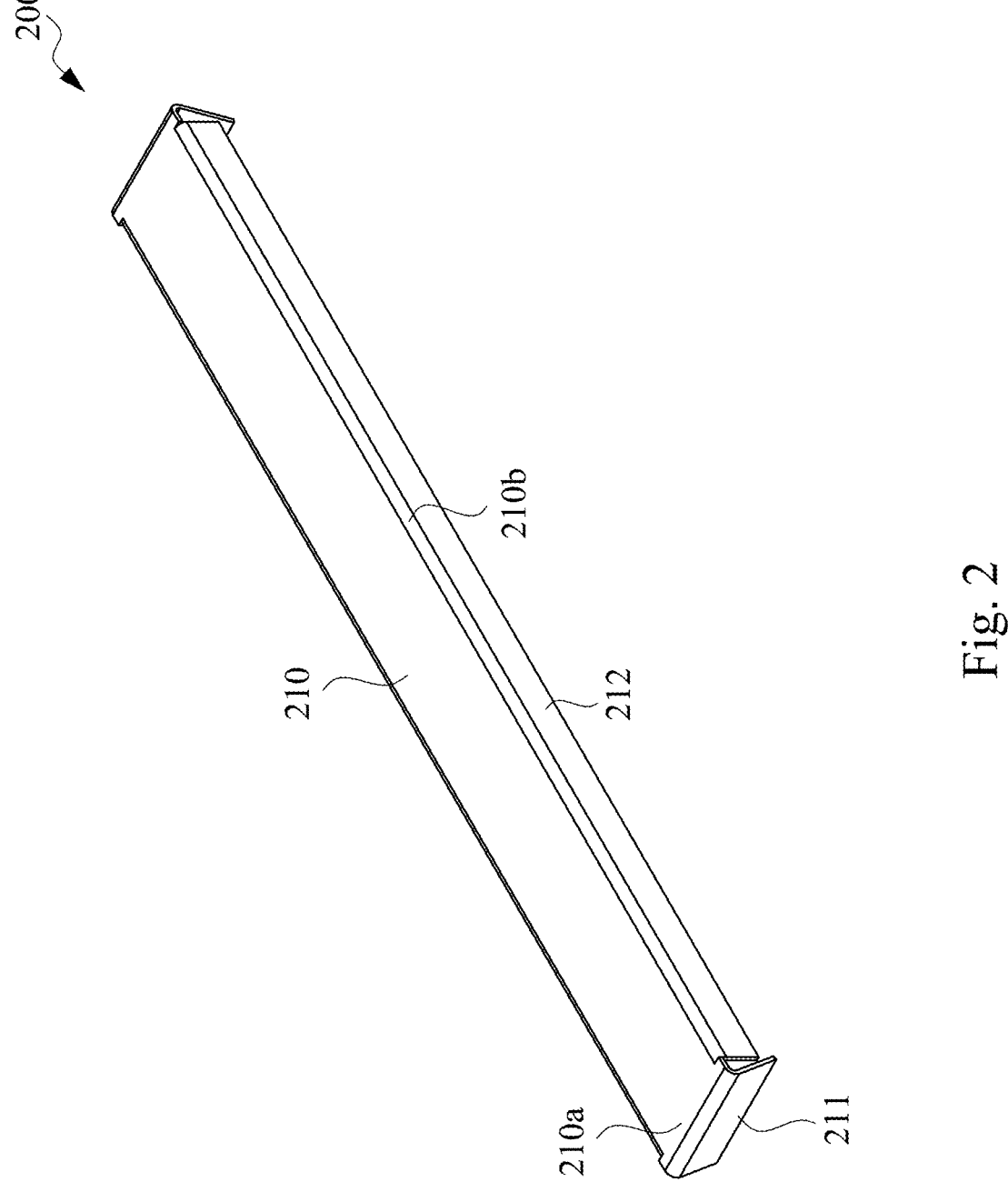
FIG. 2 is a perspective view of a bracket of a photovoltaic system in accordance with some embodiments of the present disclosure.

Reference is made to FIG. 2. FIG. 2 is a perspective view of the bracket 200 in accordance with some embodiments of the present disclosure. In such embodiments, the main portion 210 is substantially rectangular. As aforementioned, the side portions 211 extend from two opposite sides of the main portion 210, while the side portions 212 extend from two other opposite sides of the main portion 210. For example, one of the side portions 211 extends from a first side 210a of the main portion 210, and one of the side portions 212 extends from a second side 210b of the main portion 210. The first side 210a is adjacent to the second side 210b. In some embodiments, each of the side portions 212 is between the two side portions 211 and separated from the two side portions 211. In such configuration, the bracket 200 may be made of a continuous unitary piece of material. For example, the bracket 200 may be made of a metal plate formed using metal stamping or casting. In some embodiments, a thickness of the metal plate forming the bracket 200 may vary between about 0.6 mm and about 3 mm. Besides, referring back to FIG. 1B, the side portions 212 are separated from the side walls 120 and the base board 110 of the sheet 100. Also, the bracket 200 is separated from the base board 110 of the sheet 100.

To ensure that the bracket 200 provides adequate support for the photovoltaic panel 300, a ratio of an area of the mounting surface of the main portion 210 to an area of the photovoltaic panel 300 is between about 1% and about 40%. Similarly, to guarantee sufficient structural strength for securing the bracket 200 and the photovoltaic panel 300 onto the sheet 100, a ratio of an area of the side portion 211 of the bracket 200 to the area of the photovoltaic panel 300 is between about 0.3% and about 10%.

By integrating the photovoltaic panel 300 into the accommodating space S of the sheet 100 through the bracket 200, an embedded module of building-integrated photovoltaics (BIPV) is formed. This embedded module serves as a support structure for bonding the photovoltaic panel. The embedded module can be installed onto a rooftop in a manner similar to a conventional roofing sheet. In addition, since the brackets 200 and the photovoltaic panel 300 are pre-mounted before the embedded module is installed onto the rooftop, assembly steps on the rooftop of the building after the embedded module is in place may be simplified.

This pre-assembly process not only streamlines the installation but also reduces the risk associated with working at heights.

Figure 3:
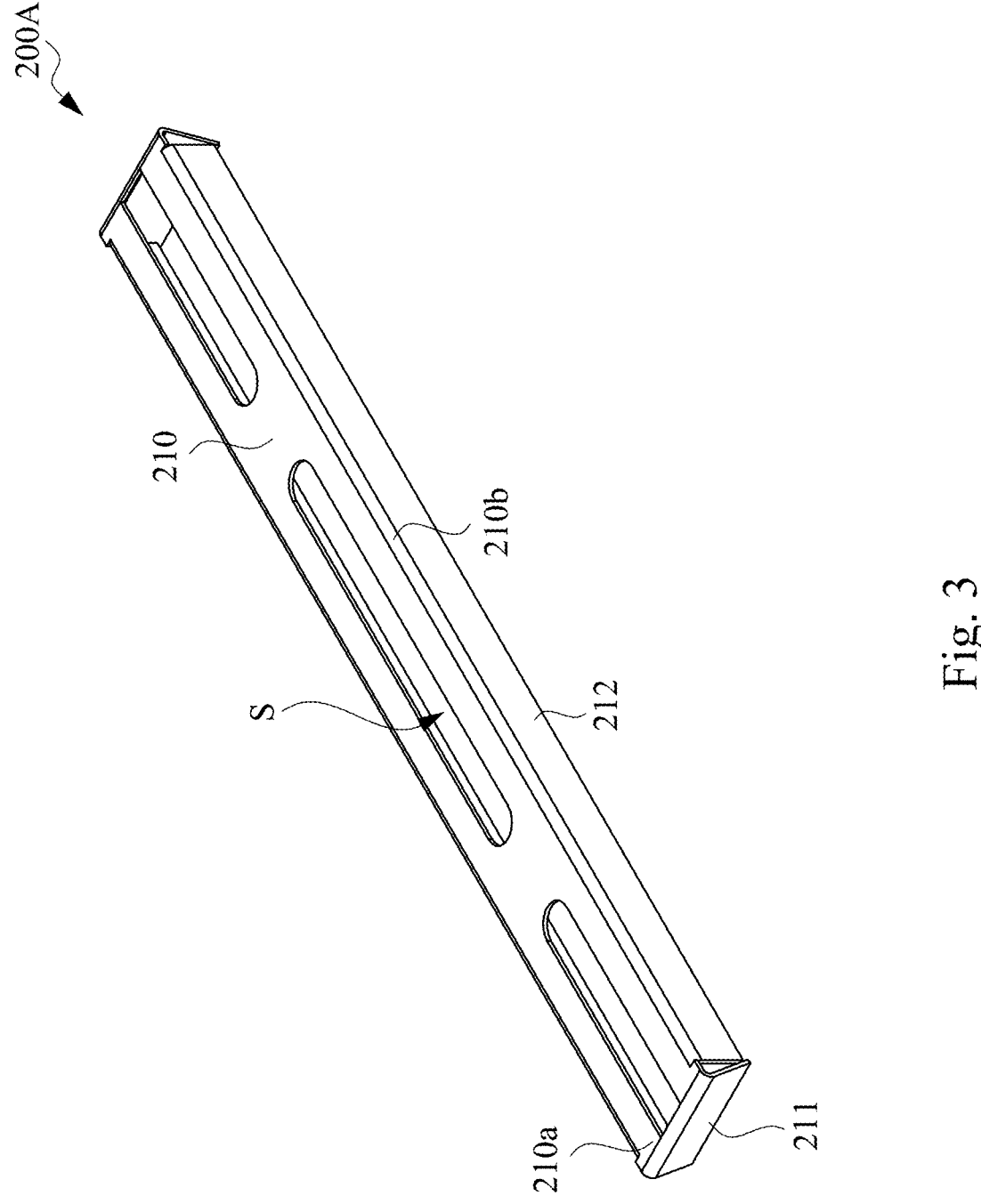
FIG. 3 is a perspective view of a bracket of a photovoltaic system in accordance with some embodiments of the present disclosure.

Reference is made to FIG. 3. FIG. 3 is a perspective view of the bracket 200A in accordance with some embodiments of the present disclosure. The difference between the bracket 200A and the bracket 200 is that the bracket 200A has a plurality of slots S. The slots S serve a dual purpose: they reduce the overall weight of the bracket 200A and facilitate the installation of rivets or cinch process. To be more specific, the slots S are strategically placed to ensure that the structural integrity of the bracket 200A is maintained, despite the reduction in material. Moreover, the slots S allow a riveter or a cinch tool to access the side portions 211 from above, making it easier to rivet or cold-form the side portions 211 to the side walls 120. This design simplifies the assembly process, ensuring that the bracket 200A can be securely attached with less effort.

Figure 4:
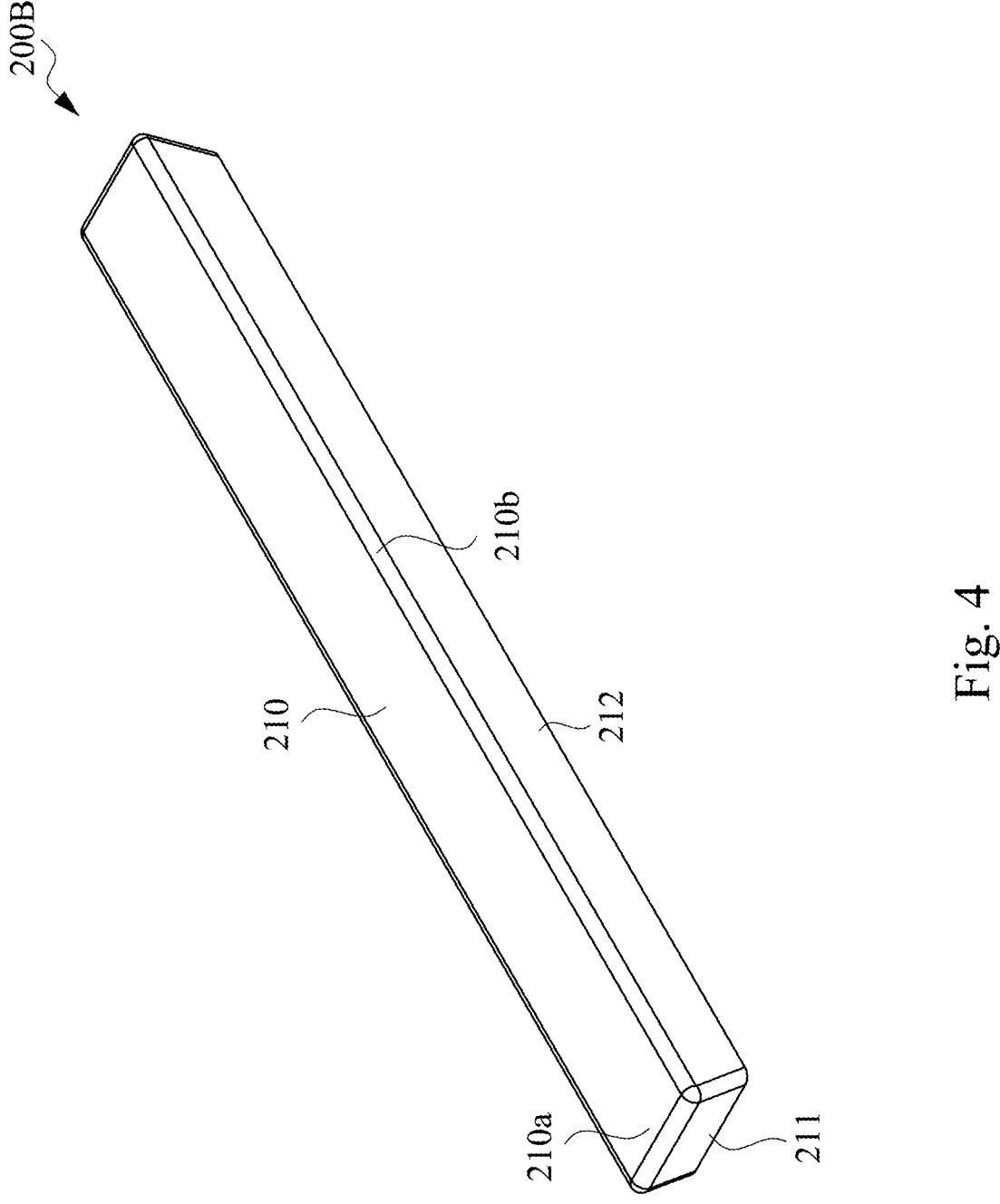
FIG. 4 is a perspective view of a bracket of a photovoltaic system in accordance with some embodiments of the present disclosure.

Reference is made to FIG. 4. FIG. 4 is a perspective view of the bracket 200B in accordance with some embodiments of the present disclosure. The difference between the bracket 200B and the bracket 200 is that the side portions 211 and the side portions 212 of the bracket 200B are connected with one another for improving the structural strength of the bracket 200B. In greater detail, the bracket 200B may be an integrally formed sheet metal box. The sheet metal box has two opposite slanted side walls and two opposite vertical side walls. The two opposite slanted side walls correspond to the side portions 211, while the two opposite vertical side walls correspond to the side portions 212 mentioned above. This configuration ensures that the bracket 200B can better withstand various stresses and loads.

Figure 5:
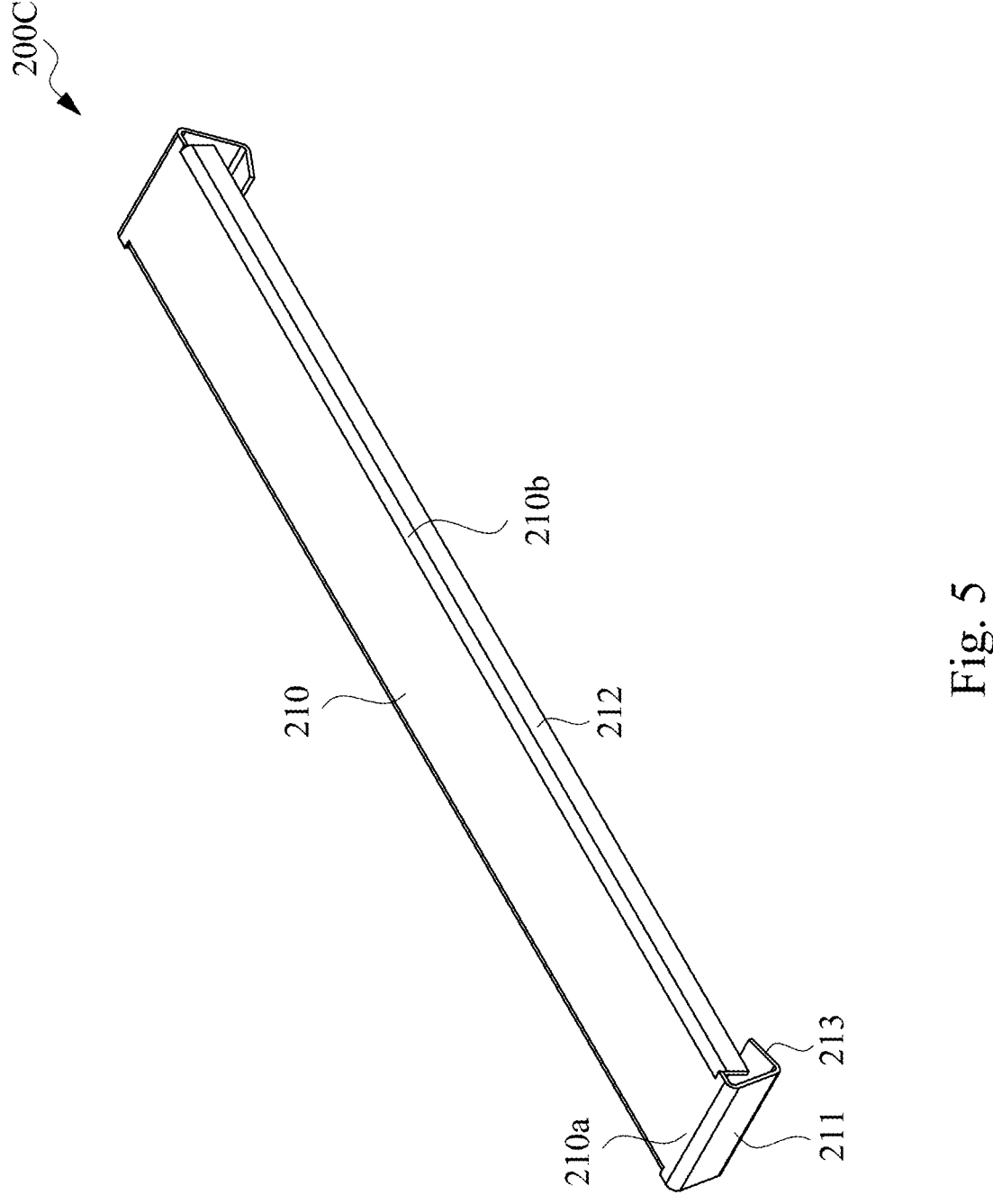
FIG. 5 is a perspective view of a bracket of a photovoltaic system in accordance with some embodiments of the present disclosure.
Figure 6:
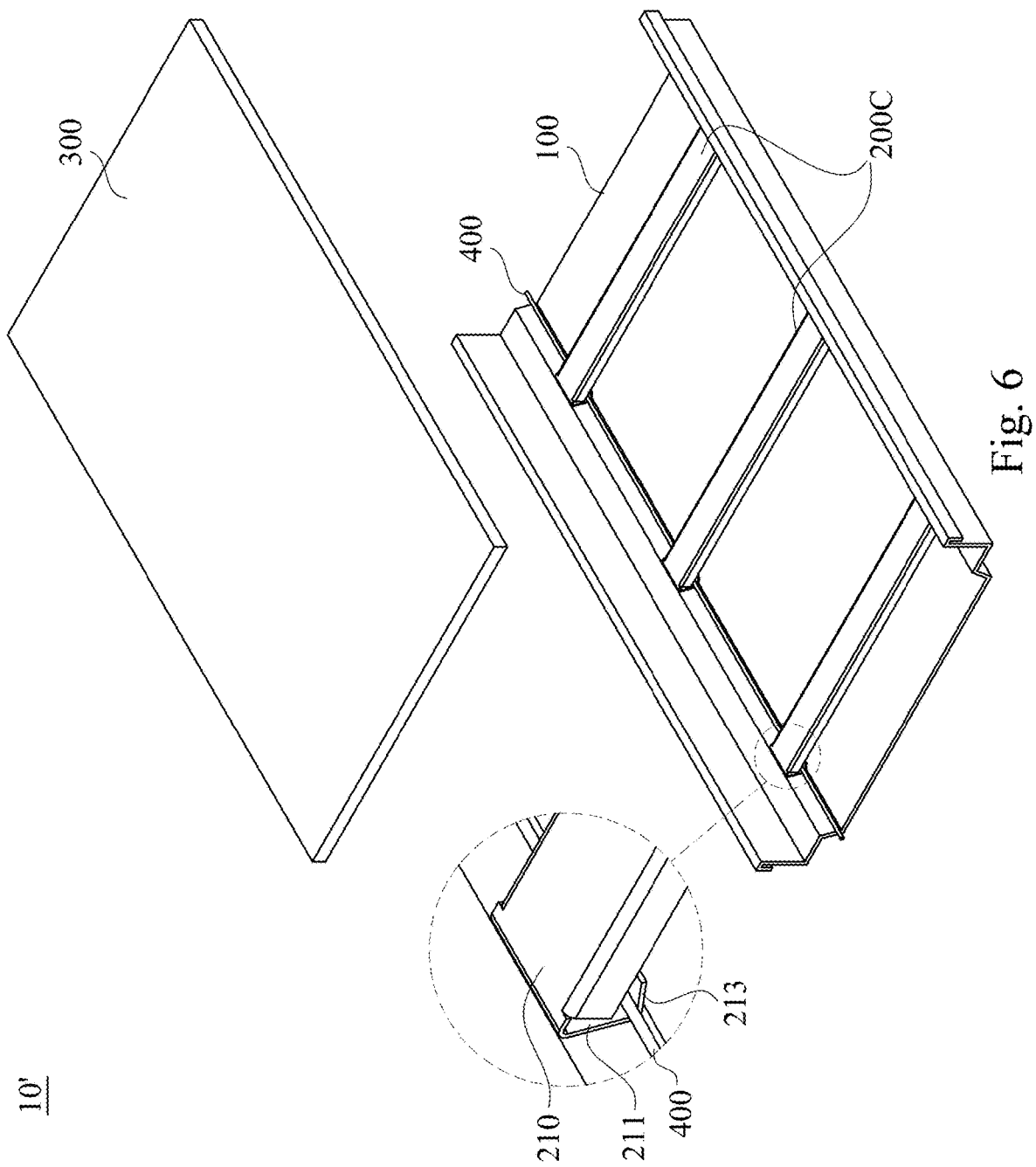
FIG. 6 is a schematic diagram of a photovoltaic system in accordance with some embodiments of the present disclosure.

Reference is made to FIG. 5 and FIG. 6. FIG. 5 is a perspective view of the bracket 200C in accordance with some embodiments of the present disclosure. FIG. 6 is a schematic diagram of the photovoltaic system 10' in accordance with some embodiments of the present disclosure.

The difference between the bracket 200C and the bracket 200 is that the bracket 200C further comprises side portions 213. The side portions 213 correspond to the side portions 211. Each of the side portions 213 is connected to a side of its corresponding one of the side portions 211 that is away from the main portion 210 (e.g., the side opposite to the first side 210a of the main portion 210). Each of the side portions 213 extends toward the main portion 210 and below the side portions 212, forming a V shape.

The difference between the photovoltaic system 10' and the photovoltaic system 10 is that the photovoltaic system 10' comprises the bracket 200C shown in FIG. 5 and a cable 400 electrically connected to the photovoltaic panel 300. As shown in FIG. 6, after the bracket 200C is coupled to the sheet 100, each of the side portions 213 extends away from an adjacent one of the side walls 120 toward the main portion 210. The cable 400 lies on one of the side portions 213, thus being mounted onto the bracket 200C. Moreover, the cable 400 is between the main portion 210 and the one of the side portions 213. As such, the cable 400 is accommodated below the photovoltaic panel 300 and in the accommodating space S, which may prevent the cable 400 from becoming entangled with other cables. Such configuration may facilitate efficient cable management in large-scale photovoltaic systems, thereby reducing maintenance requirements over the lifetime of the photovoltaic system.

Figure 7:
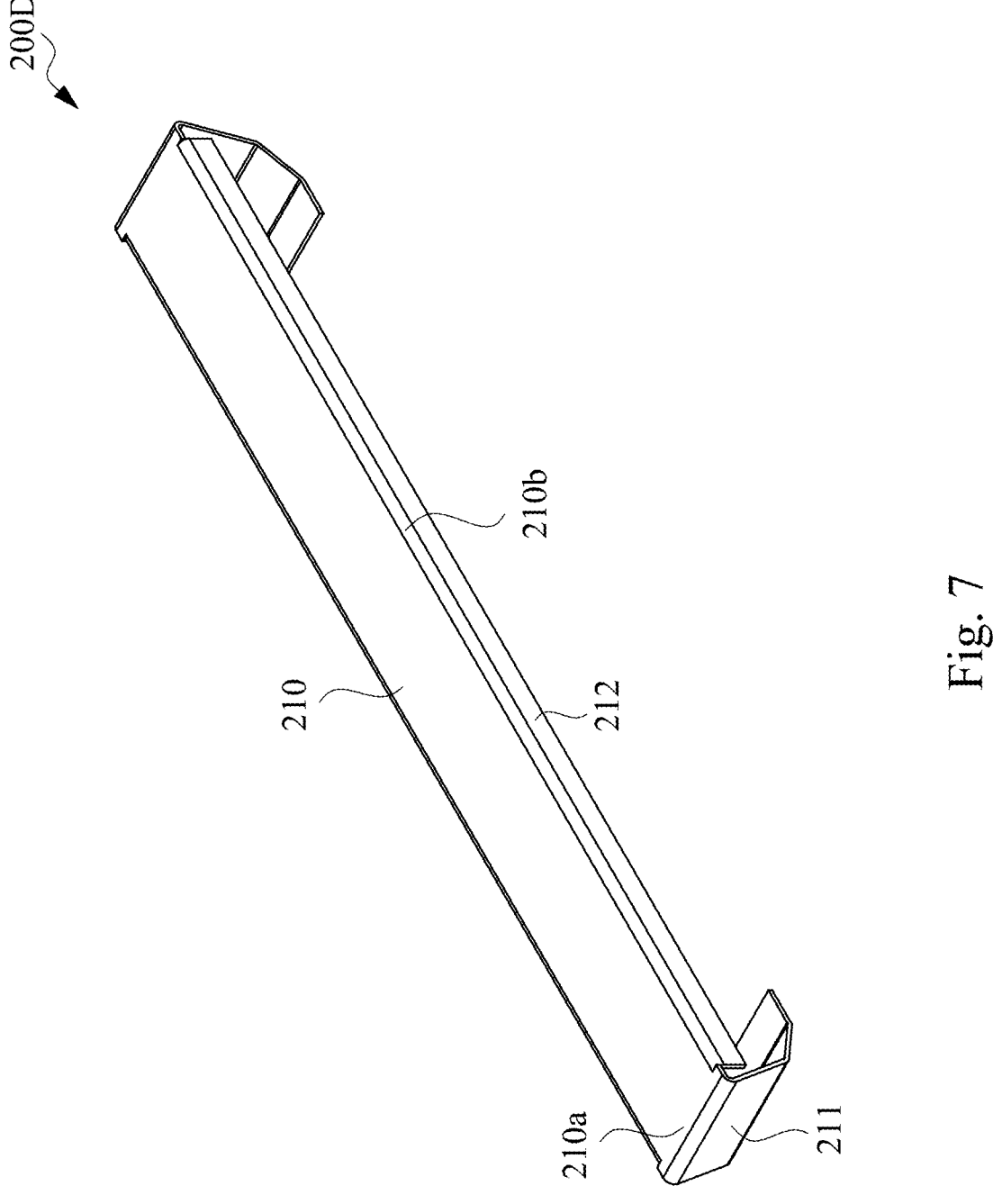
FIG. 7 is a perspective view of a bracket of a photovoltaic system in accordance with some embodiments of the present disclosure.
Figure 8:
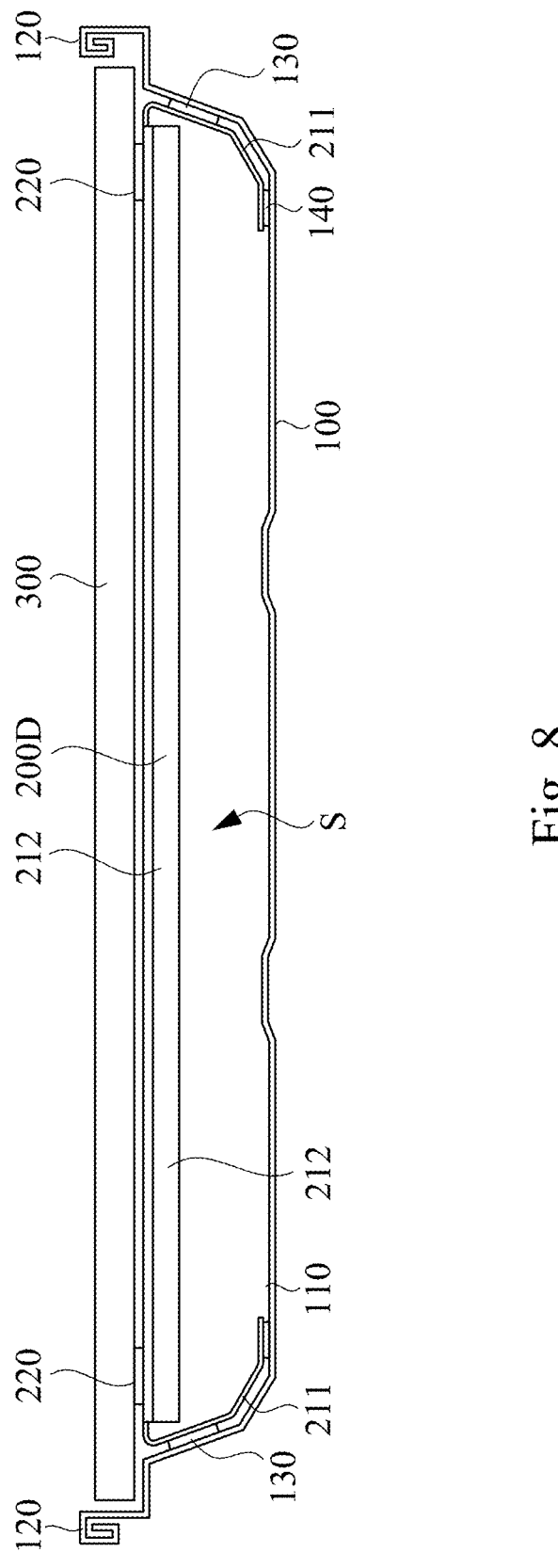
FIG. 8 is a side view of a photovoltaic system in accordance with some embodiments of the present disclosure.

Reference is made to FIG. 7 and FIG. 8. FIG. 7 is a perspective view of the bracket 200D in accordance with some embodiments of the present disclosure. FIG. 8 is a side view of the photovoltaic system 10″ in accordance with some embodiments of the present disclosure.

The difference between the bracket 200D and the bracket 200 is that the side portions 211 of the bracket 200D extend further away from the main portion 210 and below the side portions 212. In some embodiments, as shown in FIG. 7, the extended part of the side portions 211 bends inward, forming a C shape.

The difference between the photovoltaic system 10″ and the photovoltaic system 10 is that the photovoltaic system 10″ comprises the bracket 200D shown in FIG. 7. The side portions 211 of the bracket 200D extend and bend along the inner surfaces of the side walls 120, reaching down to the base board 110. In turn, certain sections of the side portions 211 that are along the side walls 120 are attached to the side walls 120 using adhesives 130. Some other sections of the side portions 211 that are over the base board 110 are attached to the base board 110 using adhesives 140. In some embodiments, the adhesives 130 and the adhesives 140 may include silicone, VHB tapes, a combination thereof, or the like. In such embodiments, the structural strength of the bracket 200D is improved.

According to the foregoing recitations of the embodiments of the disclosure, it may be seen that in the photovoltaic system of some embodiments of the present disclosure, the photovoltaic panels are embedded into the accommodating spaces of the roofing sheets through the brackets to form modules before installing the roofing sheets. In this way, the modules can be installed using the same method as conventional roofing sheets. Therefore, fewer assembly steps are conducted on the rooftop of the building after the modules are installed. Compared with common photovoltaic systems, the photovoltaic system of some embodiments of the present disclosure may reduce the time and cost associated with working at heights.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A photovoltaic system, comprising:
a sheet having a base board and two side walls, wherein the two side walls are opposite to each other and connected to the base board, and the base board and the two side walls form an accommodating space;
a bracket in the accommodating space and comprising a main portion, a first side portion, and a second side portion, wherein all the main portion is spaced apart from the base board, the first side portion extends from a first side of the main portion along one of the two side walls and is coupled to the one of the two side walls, the second side portion extends from a second side of the main portion, and the first side is adjacent to the second side; and
a photovoltaic panel in the accommodating space and over the main portion of the bracket.

2. The photovoltaic system of claim 1, wherein the bracket is made of a continuous unitary piece of material.

3. The photovoltaic system of claim 1, wherein a top surface of the photovoltaic panel is lower than top surfaces of the two side walls.

4. The photovoltaic system of claim 1, wherein the second side portion of the bracket extends a distance greater than about 1 mm from the second side of the main portion toward the base board of the sheet.

5. The photovoltaic system of claim 1, wherein the second side portion is separated from the sheet.

6. The photovoltaic system of claim 1, wherein the first side portion is separated from the second side portion.

7. The photovoltaic system of claim 1, wherein the first side portion is connected to the second side portion.

8. The photovoltaic system of claim 1, wherein the first side portion extends along the one of the two side walls to the base board and is attached to the base board.

9. The photovoltaic system of claim 1, wherein a ratio of an area of the main portion of the bracket to an area of the photovoltaic panel is between about 1% and about 40%.

10. The photovoltaic system of claim 1, wherein a ratio of an area of the first side portion of the bracket to an area of the photovoltaic panel is in a range from about 0.3% to about 10%.

11. The photovoltaic system of claim 1, wherein the bracket further comprises a third side portion, the third side portion is connected to a side of the first side portion that is opposite to the first side of the main portion, and the third side portion extends away from the one of the two side walls.

12. The photovoltaic system of claim 11, further comprising a cable electrically connected to the photovoltaic panel, wherein the cable is in the accommodating space and mounted onto the bracket through the third side portion.

13. The photovoltaic system of claim 1, wherein a topmost surface of the bracket is lower than top surfaces of the two side walls.

14. A photovoltaic system, comprising:
a sheet having a base board and two side walls, wherein the two side walls are opposite to each other and connected to the base board, and the base board and the two side walls form an accommodating space;
a bracket in the accommodating space and comprising a main portion, two first side portions, and a second side portion, wherein all the main portion is spaced apart from the base board, the two first side portions and the second side portion are connected to the main portion, the two first side portions are attached to a plurality of inner surfaces of the two side walls, respectively, and the second side portion is between the two first side portions; and
a photovoltaic panel in the accommodating space, wherein the photovoltaic panel is mounted to the bracket and a top surface of the photovoltaic panel is lower than top surfaces of the two side walls.

15. The photovoltaic system of claim 14, wherein the two first side portions extend along the inner surfaces of the two side walls, respectively.

16. The photovoltaic system of claim 14, wherein the second side portion of the bracket extends toward the base board of the sheet and is separated from the sheet.

17. The photovoltaic system of claim 14, wherein each of the two first side portions is separated from the second side portion.

18. The photovoltaic system of claim 14, wherein each of the two first side portions is connected to the second side portion.

19. The photovoltaic system of claim 14, wherein at least one of the first side portions extends below the second side portion and is attached to the base board.

20. The photovoltaic system of claim 14, wherein a ratio of an area of one of the first side portions of the bracket to an area of the photovoltaic panel is in a range from about 0.3% to about 10%.

21. The photovoltaic system of claim 14, wherein the photovoltaic panel is mounted to the bracket through a mounting surface of the bracket, and a ratio of an area of the mounting surface to an area of the photovoltaic panel is in a range from about 1% to about 40%.

22. The photovoltaic system of claim 14, wherein a topmost surface of the bracket is lower than the top surfaces of the two side walls.

* * * * *